Patented Mar. 6, 1934

1,950,004

UNITED STATES PATENT OFFICE 1,950,004

LUBRICATING NIPPLE WITH NONRETURN VALVES FOR HIGH PRESSURE LUBRICATION

Hans Kreidel, Wiesbaden, Germany

Application July 9, 1929, Serial No. 376,946
In Germany July 13, 1928

1 Claim. (Cl. 184—105)

The present invention relates to a lubricating nipple with a non-return valve for high pressure lubrication, wherein the valve body is guided along a straight path in the nipple casing whilst forming passages for the lubricant and is provided with a closure pin engaging with the inlet passage for the lubricant into the nipple casing, the free end of the pin forming a smooth grooveless flat surface free from projections with the nipple head when the valve is closed.

In the known lubricating nipples with a non-return valve, adapted for high pressure lubrication, there is the possibility of dust and other foreign matter being deposited in or around the inlet opening of the inlet passage for the lubricant in the nipple head which on the subsequent lubrication are forced in with the lubricant and reach the points to be lubricated which is undesirable.

This difficulty is overcome by the present invention in that the nipple head and the body of the non-return valve are made of a suitable construction, the latter being guided along a straight line in the nipple casing and is provided with a separate closure pin filling the inlet passage for the lubricant and forming with the nipple head a smooth flat surface.

In the accompanying drawing are illustrated by way of example two forms of construction of the invention wherein the non-return valve is respectively formed as a cone valve and as a plate valve.

Figure 1:
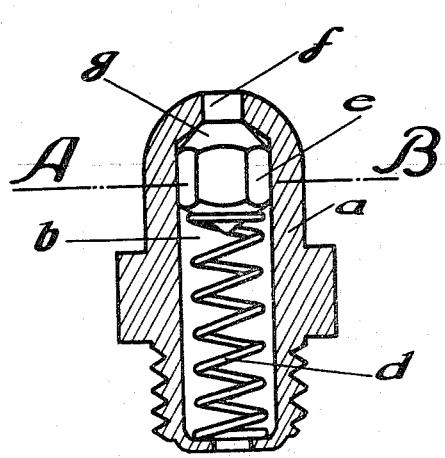
Figure 1 is a longitudinal section of a high pressure lubricating nipple with a non-return valve formed as a cone valve.
Figure 2:
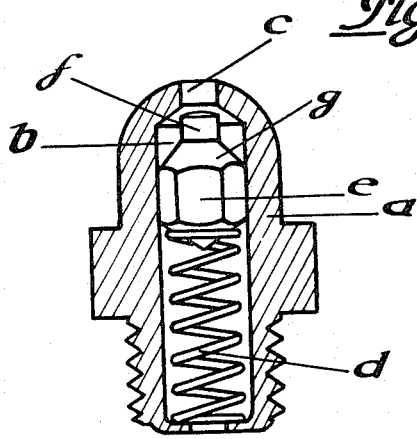
Figure 2 shows a similar longitudinal section with the valve in the open position.

In all the figures $a$ is the nipple casing with the internal bore $b$ and the inlet passage $c$ for the lubricant. The non-return valve exposed to the action of a pressure spring $d$ consists of the guide member $e$ and a closure member $f$ forming an axial extension thereof and adapted to fit into the inlet passage $c$ for the lubricant and being of corresponding shape. The guide member $e$ forms with the inner wall of the nipple casing $a$ passages for the lubricant and for this purpose is a polygonal cross section or is provided with longitudinal grooves or ribs. It slides and is guided on the inner wall of the nipple casing by means of its longitudinal edges. The guide ribs or guide edges may also be provided on the inner wall of the nipple casing when the guide member is of cylindrical shape. In the form of construction according to Figures 1 and 2 the interior of the nipple casing beyond the inlet passage $c$ is funnel shaped and the non-return valve is provided with a conical neck $g$ extending from the guide member $e$ to the closure member $f$. The angle of the conical neck is preferably more acute than the funnel shaped portion of the nipple casing so that a closure is only produced at the narrowest portion thereof.

Figure 3:
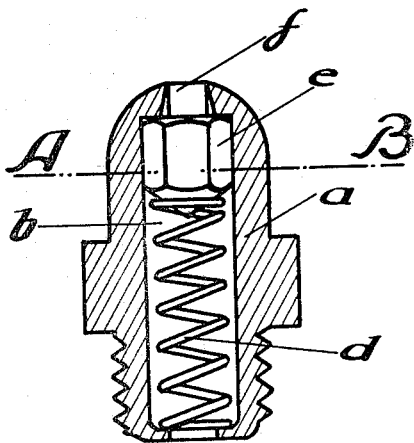
Figure 3 is a longitudinal section of a high pressure lubricating nipple in which the non-return valve is formed as a plate valve.
Figure 5:
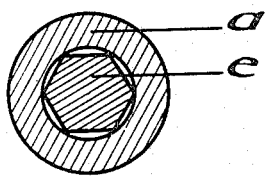
Figure 4 shows a similar longitudinal section with the non-return valve in the open position and Figure 5 is a cross section on the lines A—B of Figures 1 and 3.
Figure 4:
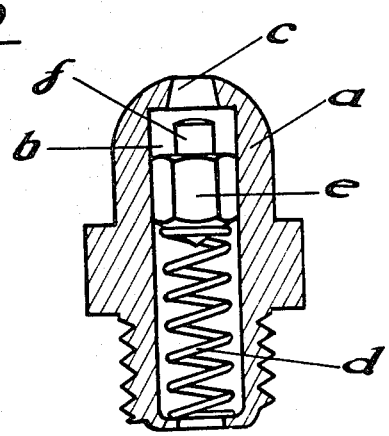

In the form of construction according to Figures 3 and 4 the interior of the nipple casing beyond the inlet passage $c$ is of uniform cylindrical shape and the closure member $f$ extends from the flat face of the guide member $e$ of the non-return valve. The closure in this case is effected in the same manner as a plate valve as the shoulders of the guide member $e$ bear against the annular bottom of the end of the nipple casing. The inlet passage $c$ for the lubricant in the head of the nipple may be somewhat enlarged towards the inside so as to prevent the closure member moving therein from becoming wedged.

The dimensions thereof are so selected and its free end is so shaped that when the spring actuated non-return valve is in its closing position the closure member fills the inlet passage $c$ for the lubricant and closes the opening thereof in an efficient manner so that dust and foreign matters are prevented from being deposited therein or around the same. Dust and foreign matters cannot enter when moving the nipple head as the head is provided with a completely closed flat upper surface. The actual valve seat against which the non-return valve bears can be arranged at such a distance from the surface of the nipple head that this and the valve spring can be made of sufficient strength so as to produce an efficient and certain closure.

Having now particularly described and ascertained the nature of my said invention and in what manner the same is to be performed, I declare that what I claim is:

A lubricating nipple of the class described, comprising a body having a small substantially cylindrical inlet passageway, a bore concentric and communicating with said inlet passageway and having a frusto-conical seating surface at the juncture of said bore and said passageway; a valve element having a cylindrical portion complemental to said passageway, a polygonal portion slidable in said bore and guided thereby and a frusto-conical portion joining said portions, the angle between the surface of said frusto-conical portion and its axis being less than the corresponding angle of said frusto-conical seating surface; and a spring normally forcing the cylindrical portion of said valve element into said inlet passageway and said frusto-conical portion against said seating surface thereby to close said passageway and form a seal at the juncture of said passageway and the frusto-conical seating surface.

HANS KREIDEL.